United States Patent
Hantusch et al.

[15] 3,634,945
[45] Jan. 18, 1972

[54] AIRCRAFT ARTIFICIAL HORIZON

[72] Inventors: Werner Hantusch, Uberlingen (Bodensee); Bernhard Strittmatter, Nussdorf (Bodensee), both of Germany

[73] Assignee: Fluggeratewerk Bodensee GmbH, Uberlingen (Bodensee) Germany

[22] Filed: May 20, 1969

[21] Appl. No.: 826,213

[30] Foreign Application Priority Data

June 8, 1968 Germany..................P 17 73 590.9

[52] U.S. Cl.............................................................33/204
[51] Int. Cl.......................................................G01c 19/44
[58] Field of Search............................33/204.2; 340/27 AT

[56] References Cited

UNITED STATES PATENTS

| 2,395,250 | 2/1946 | Carlson | 33/204 (.2) UX |
| 2,412,961 | 12/1946 | Braddon | 33/204 (.2) UX |
| 2,492,992 | 1/1950 | Handel | 33/204 (.2) |
| 2,696,597 | 12/1954 | Chombard | 33/204 (.2) X |
| 2,912,766 | 11/1959 | Hurlburt | 33/204 (.2) |
| 3,032,886 | 5/1962 | Hurlburt | 33/204 (.2) |
| 3,181,249 | 5/1965 | Coffing | 33/204 (.2) |

FOREIGN PATENTS OR APPLICATIONS

| 666,615 | 2/1952 | Great Britain | 33/204 (.2) |
| 818,614 | 8/1959 | Great Britain | 33/204 (.2) |
| 1,034,135 | 6/1966 | Great Britain | 33/204 (.2) |
| 610,615 | 12/1960 | Canada | 33/204 (.2) |
| 1,372,450 | 8/1964 | France | 33/204 (.2) |

*Primary Examiner*—Robert B. Hull
*Attorney*—Edward R. Hyde, Jr.

[57] ABSTRACT

An artificial horizon instrument for an aircraft is described which indicates horizon movements as they would naturally appear to the pilot. The instrument includes a particular support arrangement for the roll ring and pitch ring that permits movements through relatively large angles.

3 Claims, 4 Drawing Figures

INVENTORS
WERNER HANTUSCH
BERNARD STRITTMATTER

AIRCRAFT ARTIFICIAL HORIZON

This invention relates to artificial horizon devices for aircraft. The invention relates more particularly to gyroscopic horizon devices adapted for indicating roll and pitch attitudes of an aircraft.

An artificial horizon is an aircraft instrument which functions to indicate the position of the horizon to the pilot during instrument flying. In operation, the instrument presents a visual display of the aircraft's pitch and roll attitudes. Known artificial horizon devices of the gyroscopic type include a vertical gyro mounted on gimbals, an indicator cup displaying an artificial horizon line and an aircraft or reference symbol. The gyro is linked to the cup and is adapted for rotating it in two directions relative to the aircraft symbol for indicating the pitch and roll attitudes.

For pilot convenience, it is desirable to display the artificial horizon in the same manner as the pilot would view the natural horizon during visual flight. When the aircraft banks left or right, the gyro causes the artificial horizon to maintain orientation in relation to the natural horizon. During visual flight, the natural horizon would rise in the view of the pilot as the aircraft descends, while during climb attitude the natural horizon would descend in the view of the pilot. It is desirable that the artificial horizon shift in the view of the pilot in a manner corresponding to these variations of the natural horizon.

In a prior gyro artificial horizon, the gyro is located centrally in the indicator cup. The indicator cup and its horizon line are maintained horizontal by the action of the gyro and its supporting device, while the aircraft along with the instrument housing rotates about the indicator cup. Although a correct indication of bank attitudes is obtained with this arrangement, a shifting of the artificial horizon line relative to the aircraft symbol, which is stationary with respect to the housing, occurs in a manner opposite to the variation of the natural horizon. If, for instance, the aircraft descends, the artificial horizon also descends relative to the aircraft symbol, whereas the natural horizon would rise in the field of view of the human pilot.

In another known artificial gyro horizon device the artificial horizon line is maintained stationary with respect to the housing while the aircraft symbol itself is linked to and moved by the gyro. Although the moving aircraft symbol provides a desired indication of the pitch relative to the horizon line, a clear view of the position of the horizon in the field of view of the pilot is not obtained.

An all-attitude horizon is also known wherein the gyro is located in a ball indicator and the latter is supported about the pitch axis by a bifurcated roll ring. A roll ring of the gyro is supported in two ball bearings arranged behind the ball carrying the gyro. With this arrangement, pitch movement is indicated by an artificial horizon movement opposite to the movement of the natural horizon. This arrangement is further disadvantageous in that the weight of the gyro and that of the roll ring are supported in a fork in an overhung position instead of being supported between two bearings. This necessitates a relatively large, strong, and long axle with correspondingly large ball bearings and therefore considerable friction and large constructional depth. Both the large friction and constructional depth are highly undesirable.

Another artificial horizon arrangement is known which provides the desired aircraft attitude indication of pitch movements. In this arrangement the gyro is located behind an indicator cup and gyro movement is transmitted inversely to the indicator cup by means of ring and bevel gears so that movements of the artificial horizon correspond to movements of the natural horizon in view of the pilot. A device of this type is described in French Pat. No. 1,142,614. However, this arrangement undesirably necessitates a relatively large constructional length.

In a further prior art construction, an artificial horizon device having movements corresponding to movements of the natural horizon includes an artificial horizon line supported by a lever at the rear of a gyro roll ring. The horizon line is actuated by a pin on the gyro engaging a slotted portion of the layer. Through this lever arrangement, a reversal of movement is effected and a movement of the horizon line approximating movements of the natural horizon will be obtained. However, the movements of the horizon line are not linear and an evaluation of the attitude and angle becomes difficult.

Accordingly it is an object of this invention to provide an improved artificial horizon device for an aircraft.

Another object of the invention is to provide an improved artificial horizon device for aircraft which presents movement of the artificial horizon in a manner corresponding to movements of the natural horizon in the view of the pilot.

A further object of the invention is to provide an artificial horizon device for aircraft which presents movements of the artificial horizon in a manner corresponding to movements of the natural horizon yet which is relatively short in length and relatively compact.

A more specific object of the invention is to provide a compact artificial horizon instrument having supporting structure for the roll-and-pitch rings that permit movement thereof through relatively large angles.

In accordance with features of this invention, an artificial horizon includes a gimbal having a roll ring adapted to rotate about an axis parallel to the roll axis of an aircraft and a pitch ring comprising the housing of the gyro supported on a roll ring and adapted to rotate about an axis parallel to the pitch axis of the aircraft. The roll ring includes a journal positioned in a bearing which is supported by a rigidly mounted body extending about a segment of the roll ring. A horizon-indicator cup is positioned about and rotatably supported on the gimbal about an axis parallel to the aircraft pitch axis. The cup is supported at one pivot point by a support member which is mounted to the journal, and at a second point by drive means mounted to the roll ring. The drive means is adapted for causing the cup to rotate in a direction opposite to a direction of rotation of the pitch ring. Through this arrangement, a relatively compact and relatively large indicating scale horizon is provided which presents movements of the artificial horizon in a manner corresponding to movements of the natural horizon. In practice, a relatively large indicating range of +/−85° about the pitch axis and of more than +/−90° about the roll axis can be attained, which is completely satisfactory for most types of aircraft.

In accordance with other features of the invention, the gyro horizon is arranged for providing that the aircraft or reference symbol is adjustable independently in two directions relative to the housing in response to roll-and-pitch trim attitudes. In order to provide an adjustment in the pitch direction independently of the adjusted roll-trim attitude, a mask having a banking level and carrying the aircraft symbol is provided and is positioned to partly cover the indicator cup. The mask is adjustably rotatable about the roll axis through a gear means while the aircraft symbol is arranged on the mask for adjustment about the pitch axis. Adjustment of the aircraft symbol about the pitch axis is effected through a gear means.

These and other objects and features of the invention will become apparent with reference to the following specifications and drawings, wherein.

Figure 1:
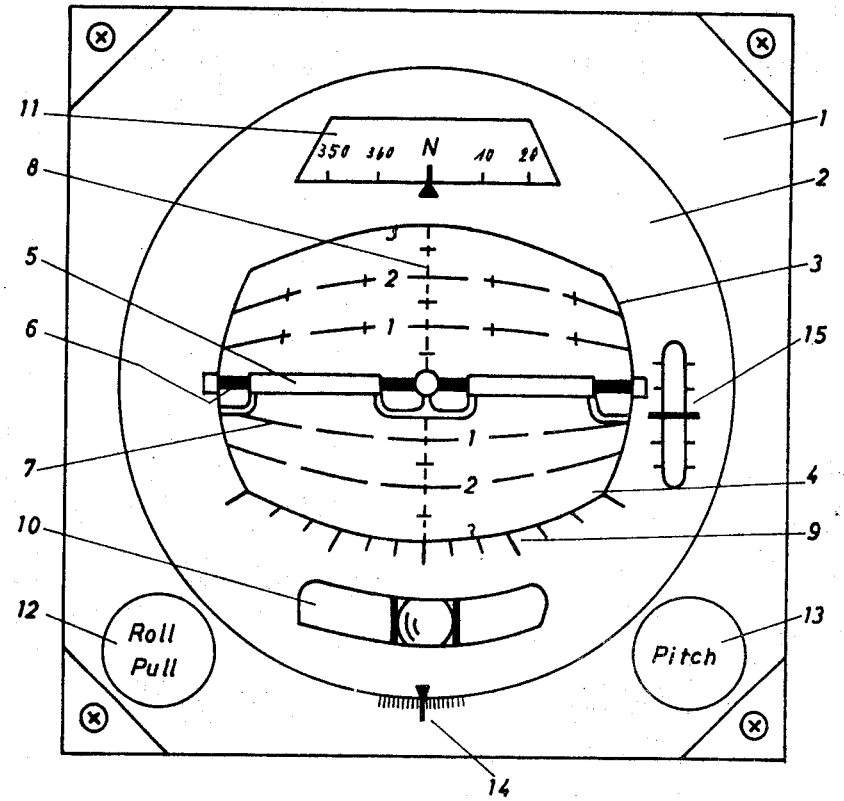
FIG. 1 is a front elevation view of an artificial horizon constructed in accordance with features of the invention.

Referring now to FIG. 1, a front plate 1 of the instrument corresponds in size to a normal 5-inch instrument and has a circular aperture or field of view enclosed by a glass plate. Behind the glass plate the aperture is covered by a mask 2 supported for rotation about the longitudinal axis of the instrument housing and having cutout portions for the indicating elements. In the center of a barrel-shaped cutout portion 3 through which the spherically curved indicator cup 4 carrying the horizon lines becomes visible, there is provided an aircraft symbol 5 designed in the conventional dash-dot-dash configuration. The artificial horizon is formed as a continuous relatively wide line 6 on the cup. Additional relatively fine interrupted lines 7 numbered upwardly and downwardly and preferably spaced apart 10° are used to indicate the aircraft pitch angle. The cup 4 is dark colored, preferably black, below the main horizon line 6 representing the earth, and is light colored, preferably gray or blue above the horizon line. A continuous hatched line 8 is formed on the cup surface to provide an indication of the roll-attitude angle up to ±60° on a scale 9 located at the lower rim of the mask. In the lower portion of the mask 2 a ball level 10 is arranged and serves to indicate the aircraft bank attitude relative to apparent gravity during turns. In the upper portion of the mask a heading indicator 11 is provided.

Roll-and-pitch control knobs 12 and 13 are provided in two lower corners of the mask 2 for adjusting the aircraft roll-and-pitch trim attitudes. The knob 12 for the roll adjustment also serves to actuate a quick-action righting or caging device. By rotating the roll knob 12 the mask 2 including the aircraft symbol 5 and the ball level 10 is adjusted about the roll axis in a manner described in detail hereinafter. The angle of roll adjustment is indicated by a scale 14 at the lower rim of the mask. By rotating the pitch knob 13, the aircraft symbol 5 is adjusted about the pitch axis. The angle of pitch adjustment is indicated by a scale 15 near the rim of the mask 2. Further, by pulling outwardly the knob 12, a quick-action righting of the gimbal system is accomplished. In the end position the knob axle is locked and thus the gimbal system blocked. Pulling the knob 12 once more will release the lock.

Figure 2:
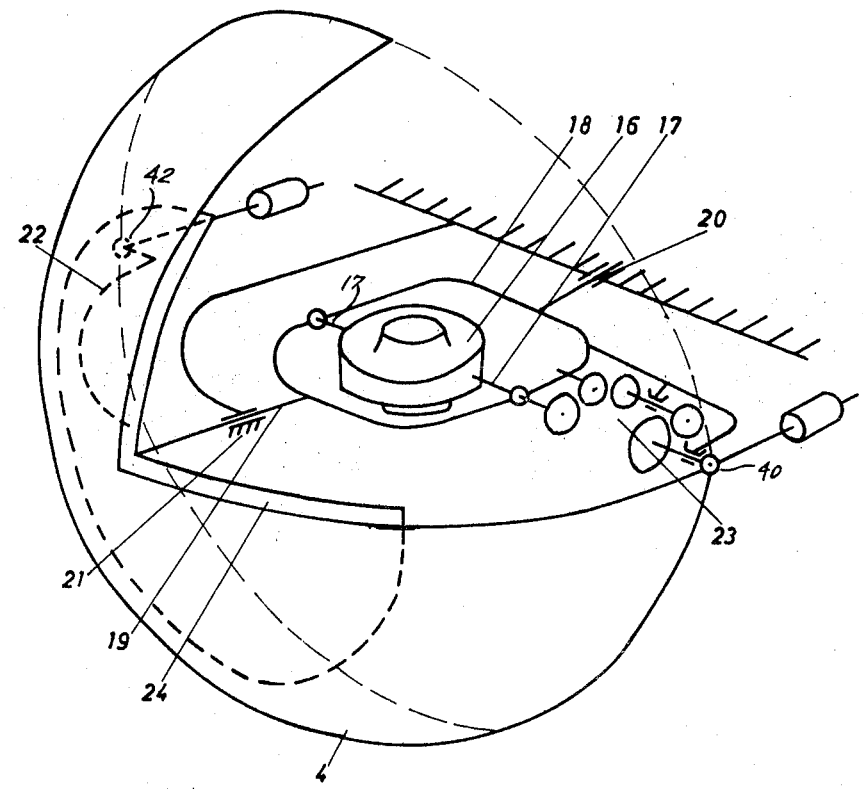
FIG. 2 is a schematic diagram illustrating a gimbal mounting, an indicator cup and cup-drive gear of the artificial horizon of FIG. 1.
Figure 4:
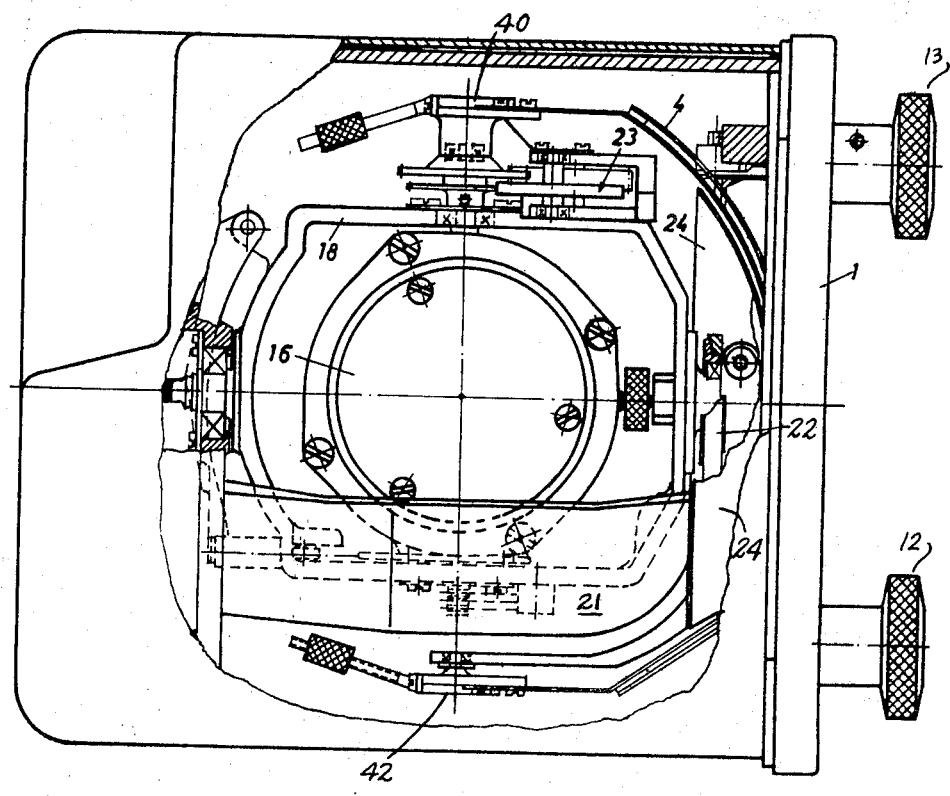

In FIGS. 2 and 4, an inner pitch ring of the gimbal comprises the gyro housing 16 and is pivoted by the journals 17 about the pitch axis in a roll ring 18. The roll ring 18 is supported by journals 19 and 20 in a bearing member 21 rigidly supported from the housing. The front journal 19 extends through the bearing member 21 and has mounted thereto for rotation therewith an indicator cup support member 22 which extends around the bearing member 21. The cup-shaped indicator 4 which includes an artificial horizon line on its surface as shown in FIG. 1 is pivotally supported from the roll ring 18 on one side at a point 40 and at a point 42 of the support member 22 on the other side. The cup is supported in alignment with the journals 17 for pivotal movement about the pitch axis. Movements of the roll ring 18 about the roll axis accompanying aircraft roll attitudes will cause movement of the points 40 and 42 and the indicator 4 thereby providing an indication of the roll attitude. During aircraft motion about the pitch axis, the pitch movements of the gyro 16 relative to the housing and to the roll ring 18 are transmitted to the indicator cup 4 through a reversing gear means 23 supported on the roll ring. The reversing gear means 23 has a 1:1 gear ratio. Alternatively, other gear ratios may be provided. The indicator cup then moves in opposition to the gyro 16. Because of this reversal by the gear means, the pitch attitude is indicated in a manner corresponding to the actual shifting of the horizon line in the pilot's field of view.

With pitch attitudes of more than ±58°, the indicating cup 4 exposes a portion of the upper or lower cutout 3 with the mask 2 which is covered by a second cup 24 mounted on the arm 22. The cup 24 follows the movements of the roll ring 18 and is preferably provided with the same colors as the ball cup 4. In addition, a vertical line representing an extension of the line 8 of the ball cup 4 is provided on the cup 24. During pitch attitude, the pivotally mounted cup 4 is rotatable about a pitch axis and during roll attitudes it is rotatable with the roll ring about a roll axis. The cup 24 which is mounted on the arm 22 is rotatable only about the roll axis.

Figure 3:
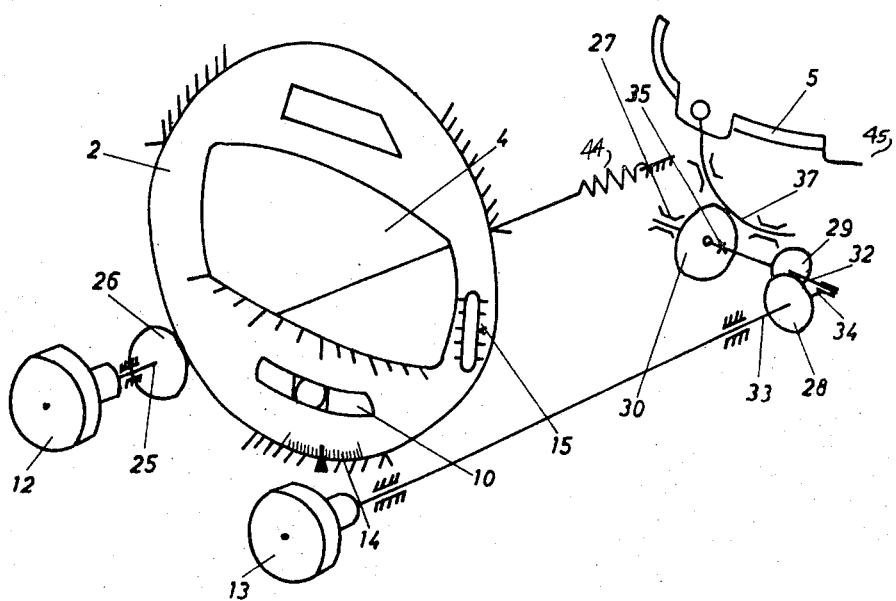
FIG. 3 is a schematic diagram illustrating an arrangement for adjusting the aircraft or reference symbol in response to the roll-and-pitch trim attitudes; and, FIG. 4 is a top view, partly cut away, of an artificial horizon constructed in accordance with the present invention.

The arrangement of the artificial horizon for providing adjustment of both the roll-and-pitch trim attitudes is schematically illustrated in FIG. 3. By rotating the knob 12 the mask 2 is rotated about the roll axis along with the aircraft symbol 5, a gear support 27 and the level 10 by a gearwheel 26 movable along the knob axle 25 in an axial direction. The angular adjustment of the mask about the roll axis and of the members 5, 27 and 10 connected with it is indicated on the scale 14 at the lower portion of the housing 1 by an index mark. The knob 12 also operates as a pull knob for quick release righting and locking of the system. The axle 25 is coupled to a spring 44. Withdrawing the knob 12 outwardly disengages the mask 2 and gear 26. The mask then returns to a reference position through the action of spring bias means, not shown.

When the knob 13 is rotated a toothed segment 37 or curved rack which is connected to the aircraft symbol 5 is adjusted along with the aircraft symbol about the pitch axis. The aircraft symbol is adjusted on the radius of the indicator cup 4 which carries the horizon line. The rack 37 is operated through bevel gears 28 and 29 and a gearwheel 30 which engages the rack. Angular adjustment of the aircraft symbol about the pitch axis is indicated on the vertical scale positioned along the rim of the cutout portion 3 by an index mark 45 on the aircraft symbol carrier. An axle 32 of the bevel gear 29 is supported at one point in a bearing 34 which is rotatable about the knob axle 33 and at another point in the bearing 27 through a universal joint 35. The axle 32 is movable in an axial direction in the gearwheel 29 and in the bearing 34 such as through the use of a spline shaft in order to compensate for the adjustment about the roll axis.

A relatively compact artificial horizon has thus been described which advantageously indicates horizon movements to the pilot in the same manner in which movements of the natural horizon would appear.

While I have illustrated and described a particular embodiment of my invention, it will be understood that various modifications may be made therein without departing from the spirit of the invention and the scope of the appended claims.

What is claimed is:

1. An artificial horizon for an aircraft comprising:
   a housing;
   a vertical gyroscope in said housing;
   a gimbal-mounting for said gyroscope comprising an outer roll ring and an inner pitch ring;
   an indicator cup supported by said roll ring for rotation relative thereto about an axis parallel in level flight to a pitch axis of the aircraft;
   said cup having a horizon line formed on a surface thereof;
   an aircraft reference symbol stationary with respect to said housing;
   gear train drive means intercoupling said cup and said pitch ring for causing said cup to rotate relative to said roll ring about said first named axis in a direction opposite to the rotation relative thereto of said pitch ring;
   said roll ring including a journal member for supporting said roll ring in a bearing, a cup support member mounted on said journal member and extending to one side of said roll ring for providing a cup pivot support on said first named axis; and
   a support member rigidly mounted on said housing and extending about said roll ring along a side portion of said ring opposite to a location of said cup drive means and providing said bearing.

2. The artificial horizon of claim 1 wherein said indicator cup comprises a segment of a sphere and wherein said roll journal bearing, said pivot support member, and said cup drive means are located within said sphere.

3. The artificial horizon of claim 1 wherein means are provided for independently adjusting the position of said aircraft reference symbol relative to both the pitch and roll axes.

* * * * *